(No Model.)
G. N. RILEY.
PIPE COUPLING.
No. 400,949. Patented Apr. 9, 1889.
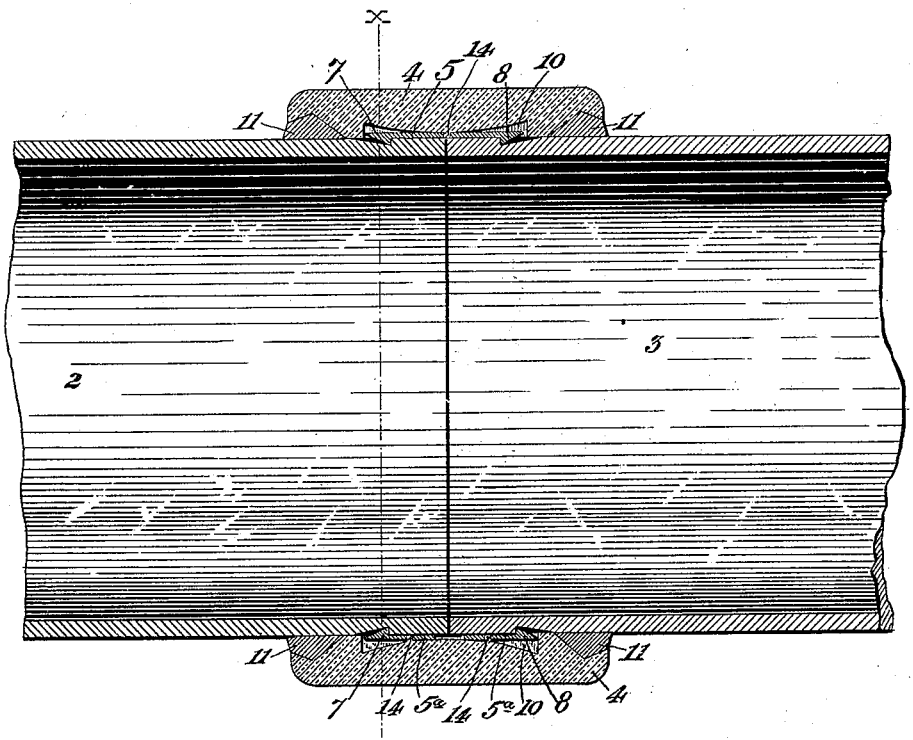
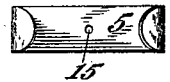
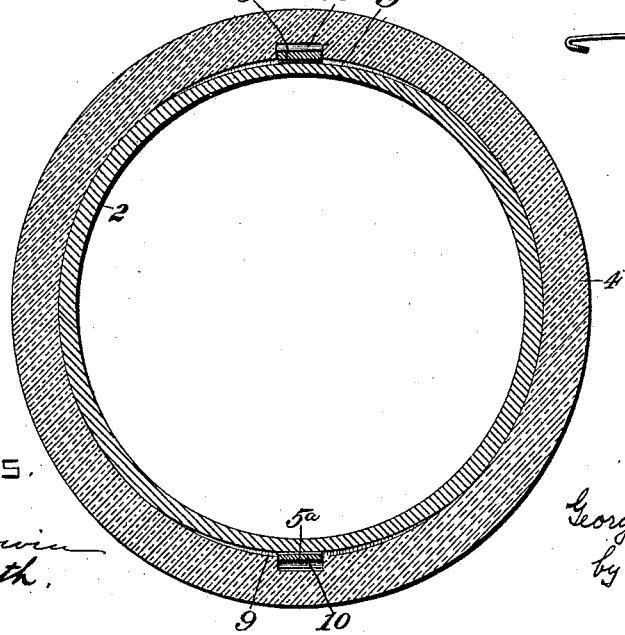
Witnesses
W. B. Corwin
J. K. Smith
Inventor
George N. Riley
by W. Bakewell & Son
his Attorneys

UNITED STATES PATENT OFFICE.

GEORGE N. RILEY, OF BRADDOCK, PENNSYLVANIA.

PIPE-COUPLING.

SPECIFICATION forming part of Letters Patent No. 400,949, dated April 9, 1889.

Application filed September 8, 1887. Serial No. 249,074. (No model.)

*To all whom it may concern:*

Be it known that I, GEORGE N. RILEY, of Braddock, in the county of Allegheny and State of Pennsylvania, have invented a new and useful Improvement in Pipe-Couplings; and I do hereby declare the following to be a full, clear, and exact description thereof.

The object of my invention is to provide an improved pipe-joint of that class wherein the abutting ends of two pipes are held in place by a locking device inside a coupling sleeve or socket, and spaces, left for the purpose between the pipes and the coupling, are calked with lead. Heretofore these locking devices have ordinarily been constituted by two short transverse grooves on the inside of the coupling. The pipes are provided on the outside with pins or studs, which in placing the pipes in the coupling are caused to enter the grooves. On giving the pipes a partial turn in the coupling the pins follow the grooves and lock both pipes to the coupling. The disadvantage of this form of coupling is the labor and difficulty often incident to turning the pipes in the coupling-sleeve and the considerable cost of constructing the several parts.

The object of my invention is to obviate these disadvantages and to afford a coupling device which is easily operated and of little cost.

In the accompanying drawings, Figure 1 is an axial section of the abutting ends of pipes coupled together with my improved joint. Fig. 2 is a vertical cross-section on the line *x* *x* of Fig. 1. Fig. 3 is a side view of the catch or locking device detached, and Fig. 4 is a plan view thereof.

Like symbols of reference indicate like parts in each.

In the drawings, 2 and 3 are the pipe-sections, and 4 is the sleeve which surrounds the pipes at the joint in the usual way. On the inside of the sleeve are longitudinal grooves or cavities 10, in which are fitted the locking devices or catches 5 5ª, and said cavities 10 may be enlarged at their ends—that is to say, made deeper and wider—to provide for lateral and vertical movement of the ends of the locking devices or catches. In Fig. 1 I show two of these catches arranged inside the coupling diametrically opposite to each other, though there may be as many of them as desired. For the sake of convenience in illustration I show them different in form, though both of them are constructed and act according to the same principle. I shall first describe the upper one of these two catches. It consists of a short piece of steel having at its ends hooks 7 and 8, which are adapted to engage in notches or recesses 9 in the surface of the pipes and to hold the pipes together, as shown in Fig. 1. The recess 9 in the ends of the pipe is deepest in the middle, gradually tapering toward the end, thereby forming inclines up which the catch can ride to escape from the recess or groove and disengage when the pipe is rotated. I show this catch 5 held to the coupling by means of a short pin or stud, 14, which is cast on the inside surface of the latter and fits in a corresponding hole, 15, in the catch, so that any strain on the catch arising from tendency of the pipes to separate is divided between the pipes and the coupling-sleeve. The catch may, however, be used without the pin or stud, if desired, and may have rounded ends or grips to allow of a slight lateral play. The other catch, which I show at the lower part of Fig. 1, is made of two parts, 5ª 5ª, which are set in the recesses 10 and held to the coupling by pins 14. The hooks 7 and 8 at the ends of the parts are adapted to catch in notches in the pipe in the same manner as described above.

Of course, if it is desired, both the catches may be made the same in construction.

The coupling is made in the following manner: It being customary in this style of joint to apply the sleeve to one of the pipes 2 before it is laid. In making this joint in the same way the catches 5 5ª are placed in the recesses 10, and one of the pipes is pushed into the coupling until its notches 9 come into opposition to the hooks 7, when these hooks will spring forward into the notches and will engage the pipe. The usual calking-recess, 11, around one end of the coupling, is then calked with lead. To couple the other pipe, 3, in laying the line, its end is inserted into the coupling-sleeve and pushed therein until the hooks 8 of the catches 5 5ᵃ engage the notches in the pipe. The pipes are then held firmly together, and when the annular recess 11 in the coupling around the pipe is calked the joint is completed. For the purpose of uncoupling the pipes, the notches 9 are made deepest in the middle, gradually tapering toward the ends, as shown in Fig. 2, so that on giving the pipe a partial turn the hooks at the ends of the catches are shoved back into the recesses, which are enlarged at the ends, and so disengaged from the notches.

It will be noticed that in coupling the pipes they are introduced into the coupling-sleeve in straight lines, and do not need to be turned in order to be engaged with the locking devices. The advantage of this is that it enables the pipes to be easily joined together as well on level ground as when they are inclined.

In the upper part of Fig. 1 I show the catches 5 constituted of a strip of steel having the hooks formed by thickening the ends and shaping them. It need not be made of very great strength, because the strain is substantially rectilinear and is exerted on the hook between the shoulder of the recess in the coupling-sleeve and the shoulder on the pipe, and therefore, even if the parting of the pipes should break the catch in the middle, the hooks would still hold the pipes to the coupling-sleeve, and would thus prevent breaking of the joint.

In Figs. 3 and 4 I show the same form of catch, with the difference that the hooks are formed simply by bending over the metal at the ends.

As compared with the threaded pipe-joints which are often used, the advantages of my improved joint, besides those which I have specified, are that it obviates the necessity for threading the pipe-sections, and can thus be used in cases when the pipe is too thin to stand the weakening occasioned by the cutting necessary in threading. The strength of a pipe is very much diminished by threading it, so that in computing the strength of a threaded pipe it is calculated as of a pipe the thickness of whose sides is the distance between the inside surface of the pipe and the bottom of the thread. An unthreaded pipe, although of comparatively small weight, will therefore afford the same strength as a larger and heavier pipe when threaded. The pipes are thus easier to handle and to connect than threaded pipes of the same capacity, and are cheaper, because they are of less weight of metal, and are not subject to the labor and expense of cutting the thread. Besides this, the effect of the unequal temperature to which underground pipes are subject makes a threaded joint impracticable for pipes of large size. In my joint, however, the parts are not subject to injury from this cause, for they are not held rigidly, and the joint is therefore especially safe for use either on water-pipes or gas-pipes.

Another advantage of the joint is that it enables the pipes to be deflected in laying them in uneven or hilly ground without bending the pipes themselves. As before stated, the connection at the joint is not rigid, and will permit the pipes to be moved laterally somewhat without impairing the security of the joint. This is aided by a construction of the extremities of the catch 5, which I show in Fig. 4, they being curved or partially circular in form. The bending of the pipe-line is therefore at the joint, and not necessarily in the body of any of the pipes. This is not possible with a threaded joint.

Another advantage gained by my construction is that the sleeves and catches can be placed in position on one end of the pipe and the calking inserted in the calking-recess before the pipe is laid. The other end of the pipe may then be inserted in the sleeve on the end of the pipe already laid and forced home until the catches in said sleeve catch in the notches on the latter pipe, thereby holding the two parts together while the other end of the sleeve is being calked. This only requires the removal of the earth at the end of the sleeve that is to be calked, so that the joint is left well supported, and not liable to sag from subsequent packing of the earth. In the ordinary pipe-coupling, in which the sleeve is calked to the pipe, the calking must be done after the pipe is laid, which necessitates the removal of the earth from under the joint to afford the workman room to calk the under side, thereby leaving the joint wholly unsupported and increasing the liability to sag by subsquent sinking of the filling.

I claim—

1. In a pipe-coupling, a pipe having an encircling sleeve or socket provided with a calking-recess and inclosed movable catch adapted to grip and hold the end of the opposite pipe during the insertion of the calking or packing, substantially as and for the purposes described.

2. In a pipe-coupling, the combination, with the pipes, of an encircling sleeve having calking-recesses at its opposite ends, and inclosed movable spring-catches adapted to grip the ends of the pipes when inserted in the sleeve and hold the same during the application of the calking or packing, substantially as and for the purposes specified.

3. In a pipe-coupling, the combination of a pipe having a catch-notch, an encircling sleeve provided with a catch-recess which is enlarged at its end, and an interposed spring-catch, substantially as and for the purposes specified.

4. In a pipe-coupling, the combination of a pipe having a catch-notch with inclined bottom, an encircling sleeve provided with a catch-recess enlarged at its end, and an interposed spring-catch, substantially as and for the purposes specified.

5. In a pipe-coupling, the combination of pipes having a catch-notch, a sleeve having a catch-recess, and an interposed catch having its hook end rounded, substantially as and for the purposes specified.

In testimony whereof I have hereunto set my hand this 30th day of August, A. D. 1887.

GEORGE N. RILEY.

Witnesses:
W. B. CORWIN,
THOMAS W. BAKEWELL.